(12) United States Patent
Yamamoto

(10) Patent No.: US 11,959,654 B2
(45) Date of Patent: *Apr. 16, 2024

(54) AIR CONDITIONER, DATA TRANSMISSION METHOD, AND AIR CONDITIONING SYSTEM

(71) Applicant: FUJITSU GENERAL LIMITED, Kanagawa (JP)

(72) Inventor: Izumi Yamamoto, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 364 days.

This patent is subject to a terminal disclaimer.

(21) Appl. No.: 17/281,090

(22) PCT Filed: Oct. 10, 2019

(86) PCT No.: PCT/JP2019/040096
§ 371 (c)(1),
(2) Date: Mar. 29, 2021

(87) PCT Pub. No.: WO2020/075824
PCT Pub. Date: Apr. 16, 2020

(65) Prior Publication Data
US 2021/0333001 A1  Oct. 28, 2021

(30) Foreign Application Priority Data
Oct. 11, 2018  (JP) .................................. 2018-192355

(51) Int. Cl.
*F24F 11/58*  (2018.01)
*F24F 11/49*  (2018.01)
(Continued)

(52) U.S. Cl.
CPC .............. *F24F 11/49* (2018.01); *F24F 11/54* (2018.01); *F24F 11/58* (2018.01); *F24F 11/61* (2018.01);
(Continued)

(58) Field of Classification Search
CPC ........ F24F 11/58; F24F 11/64; G05B 13/0265
See application file for complete search history.

(56) References Cited

U.S. PATENT DOCUMENTS

| 7,006,881 B1 | 2/2006 | Hoffberg et al. |
| 2007/0107450 A1 | 5/2007 | Sasao et al. |

(Continued)

FOREIGN PATENT DOCUMENTS

| CA | 3058373 | 10/2018 |
| CN | 102362481 | 2/2012 |

(Continued)

OTHER PUBLICATIONS

English translation of Notice of Reasons for Refusal issued for corresponding Japanese Patent Application No. 2020-044414, dated Apr. 6, 2021.
(Continued)

*Primary Examiner* — Mohammad Ali
*Assistant Examiner* — Vincent W Chang
(74) *Attorney, Agent, or Firm* — Greenblum & Bernstein, P.L.C.

(57) ABSTRACT

An air conditioner includes an adapter including a control unit that controls the air conditioner using a learning model and a communication unit that communicates with a server device that generates the learning model on the basis of operation history data of the air conditioner. The adapter includes an acquisition unit, a determination unit, an erasing unit, and a transmission unit. The acquisition unit acquires the data every predetermined cycle from the air conditioner.

(Continued)

The determination unit determines whether or not an amount of change between temporally continuous data of the data acquired by the acquisition unit is within a predetermined range. The erasing unit leaves at least one of the continuous data and deletes the other data in a case where the amount of change between the continuous data is within the predetermined range. The transmission unit transmits the data after being deleted to the server device.

10 Claims, 11 Drawing Sheets

(51) Int. Cl.
| | |
|---|---|
| *F24F 11/54* | (2018.01) |
| *F24F 11/61* | (2018.01) |
| *F24F 11/62* | (2018.01) |
| *F24F 11/64* | (2018.01) |
| *F24F 11/65* | (2018.01) |
| *F24F 11/89* | (2018.01) |
| *G05B 13/02* | (2006.01) |
| *G06N 20/00* | (2019.01) |
| *F24F 110/10* | (2018.01) |
| *F24F 110/12* | (2018.01) |
| *F24F 110/20* | (2018.01) |
| *F24F 120/10* | (2018.01) |
| *F24F 130/10* | (2018.01) |
| *F24F 140/60* | (2018.01) |

(52) U.S. Cl.
CPC .............. *F24F 11/62* (2018.01); *F24F 11/64* (2018.01); *F24F 11/65* (2018.01); *F24F 11/89* (2018.01); *G05B 13/0265* (2013.01); *G06N 20/00* (2019.01); *F24F 2110/10* (2018.01); *F24F 2110/12* (2018.01); *F24F 2110/20* (2018.01); *F24F 2120/10* (2018.01); *F24F 2130/10* (2018.01); *F24F 2140/60* (2018.01)

(56) References Cited

U.S. PATENT DOCUMENTS

| | | | | |
|---|---|---|---|---|
| 2008/0140627 | A1* | 6/2008 | Bossman | G06F 16/217 |
| 2009/0292662 | A1 | 11/2009 | Ueno et al. | |
| 2012/0215759 | A1 | 8/2012 | McCoy et al. | |
| 2013/0212420 | A1* | 8/2013 | Lawson | G06F 16/9535 |
| | | | | 713/400 |
| 2016/0103911 | A1 | 4/2016 | Logue et al. | |
| 2017/0159956 | A1 | 6/2017 | Lewis et al. | |
| 2017/0328593 | A1 | 11/2017 | Enya et al. | |
| 2018/0144621 | A1 | 5/2018 | Arai et al. | |
| 2018/0195752 | A1 | 7/2018 | Sasaki et al. | |
| 2018/0283723 | A1 | 10/2018 | Ock et al. | |
| 2019/0102432 | A1* | 4/2019 | Lee | G06F 16/24556 |
| 2019/0178514 | A1 | 6/2019 | Sasaki et al. | |
| 2020/0025403 | A1 | 1/2020 | Oumi et al. | |
| 2020/0073347 | A1* | 3/2020 | Ma | G05B 19/042 |
| 2020/0200414 | A1* | 6/2020 | Kwon | G05B 13/0265 |
| 2020/0256581 | A1 | 8/2020 | Wang et al. | |
| 2021/0041121 | A1* | 2/2021 | Park | F24F 1/0035 |

FOREIGN PATENT DOCUMENTS

| | | |
|---|---|---|
| CN | 105956005 | 9/2016 |
| CN | 106131515 | 11/2016 |
| CN | 106649832 | 5/2017 |
| CN | 106817909 | 6/2017 |
| CN | 107110539 | 8/2017 |
| CN | 107355946 | 11/2017 |
| CN | 108317670 | 7/2018 |
| EP | 3249483 | 11/2017 |
| JP | 2004-013674 A | 1/2004 |
| JP | 2004-199377 | 7/2004 |
| JP | 2005-038246 A | 2/2005 |
| JP | 2006-235797 | 9/2006 |
| JP | 2006-251997 A | 9/2006 |
| JP | 2009-139029 A | 6/2009 |
| JP | 2011-017515 A | 1/2011 |
| JP | 2012-175589 | 9/2012 |
| JP | 2014-016095 A | 1/2014 |
| JP | 2016-066160 A | 4/2016 |
| JP | 2017-067427 A | 4/2017 |
| JP | 2018-59706 | 4/2018 |
| JP | 2018-073258 | 5/2018 |
| JP | 2018-084854 A | 5/2018 |
| JP | 2018-084958 A | 5/2018 |

OTHER PUBLICATIONS

English translation of Notice of Reasons for Refusal issued for corresponding Japanese Patent Application No. 2020-044415, dated Apr. 6, 2021.
International Search Report issued in International Patent Application No. PCT/JP2019/040096, dated Nov. 12, 2019, along with an English translation thereof.
Written Opinion of the International Searching Authority issued in International Patent Application No. PCT/JP2019/040096, dated Nov. 12, 2019.
Extended European Search Report issued for corresponding European Patent Office Application No. 21184972.4, dated Oct. 26, 2021.
Extended European Search Report issued for corresponding European Patent Office Application No. 21184973.2, dated Oct. 26, 2021.
Official Action issued for corresponding Chinese Patent Office Application No. 201980064481.3, dated Nov. 2, 2021.
Official Action issued for corresponding Australian Patent Office Application No. AU2019357534, dated Nov. 29, 2021.
Office Action issued for corresponding Chinese Patent Application No. 202110799149.0, dated Apr. 25, 2022, and corresponding English translation.
Office Action issued for corresponding Chinese Patent Application No. 202110799203.1, dated Apr. 28, 2022, and corresponding English translation.
Office Action issued for corresponding U.S. Appl. No. 17/383,795, dated May 11, 2023.
Office Action issued for corresponding U.S. Appl. No. 17/383,640, dated May 10, 2023.
Office Action issued for corresponding U.S. Appl. No. 17/383,795, dated Nov. 16, 2023.

* cited by examiner

FIG.6

| ITEM NO. | ITEM NAME | CONTENT | HOUSE-HOLD | BUSI-NESS |
|---|---|---|---|---|
| 1 | OPERATION STATE | ON-OFF STATE OF OPERATION | ○ | ○ |
| 2 | OPERATION MODE | STATE SUCH AS COOLING, HEATING OR THE LIKE | ○ | ○ |
| 3 | SET TEMPERATURE | INDOOR TARGET TEMPERATURE | ○ | ○ |
| 4 | INDOOR TEMPERATURE | ACTUAL TEMPERATURE INSIDE ROOM | ○ | ○ |
| 5 | INDOOR HUMIDITY | ACTUAL HUMIDITY | ○ | ○ |
| 6 | AIR VOLUME | AIR VOLUME OF INDOOR FAN | ○ | ○ |
| 7 | WIND DIRECTION | INDOOR WIND DIRECTION | ○ | ○ |
| 8 | HUMAN DETECTION SENSOR | PRESENCE OR ABSENCE OR ACTIVITY AMOUNT OF PERSON | ○ | ○ |
| 9 | RADIATION SENSOR | TEMPERATURE OF FLOOR OR WALL | ○ | ○ |
| 10 | INDOOR HEAT EXCHANGE TEMPERATURE | TEMPERATURE OF INDOOR HEAT EXCHANGER | | ○ |
| 11 | OUTDOOR TEMPERATURE | ACTUAL TEMPERATURE OUTSIDE ROOM | | ○ |
| 12 | NUMBER OF REVOLUTIONS OF COMPRESSOR | NUMBER OF OPERATION REVOLUTIONS OF COMPRESSOR | | △ |
| 13 | OUTDOOR AIR VOLUME | AIR VOLUME OF OUTDOOR FAN | | △ |
| 14 | OPERATION CURRENT | OPERATION CURRENT OF ENTIRE AIR CONDITIONER | | △ |
| 15 | OUTDOOR HEAT EXCHANGE TEMPERATURE | OUTDOOR HEAT EXCHANGER TEMPERATURE | | △ |
| 16 | DISCHARGE TEMPERATURE | TEMPERATURE OF DISCHARGE PIPE OF COMPRESSOR | | ○ |
| 17 | COMPRESSOR TEMPERATURE | TEMPERATURE OF BOTTOM OF COMPRESSOR | | ○ |
| 18 | EXPANSION VALVE OPENING DEGREE | OPENING DEGREE OF ELECTRONIC EXPANSION VALVE | | ○ |
| 19 | RADIATOR TEMPERATURE | TEMPERATURE OF POWER SEMICONDUCTOR | | ○ |
| 20 | START FAILURE HISTORY | HISTORY OF COMPRESSOR START FAILURE | | ○ |
| 21 | ABNORMAL STOP HISTORY | HISTORY OF ABNORMAL STOP | | ○ |
| 22 | EMERGENCY OPERATION HISTORY | EXECUTION HISTORY OF EMERGENCY OPERATION | | ○ |
| 23 | TIME STAMP | ACQUISITION YEAR, MONTH, DAY, HOUR, MINUTE, AND SECOND | ○ | ○ |
| 24 | AIR CONDITIONER ID | UNIQUE ID NUMBER | ○ | ○ |
| 25 | INSTALLATION PLACE | INSTALLED ADDRESS (USING ZIP CODE) | ○ | ○ |
| 26 | FACILITY TYPE | TYPES OF STORE, RESTAURANT, FACTORY, OR THE LIKE | | ○ |

* MARK △ IS UNNECESSARY DATA WHILE STOPPED

FIG.7

| ITEM NO. | ITEM NAME | CONTENT | SUM-MER | WIN-TER |
|---|---|---|---|---|
| 1 | OPERATION STATE | ON-OFF STATE OF OPERATION | ○ | ○ |
| 2 | OPERATION MODE | STATE SUCH AS COOLING, HEATING OR THE LIKE | △ | △ |
| 3 | SET TEMPERATURE | INDOOR TARGET TEMPERATURE | ○ | ○ |
| 4 | INDOOR TEMPERATURE | ACTUAL TEMPERATURE INSIDE ROOM | ○ | ○ |
| 5 | INDOOR HUMIDITY | ACTUAL HUMIDITY | ○ | ○ |
| 6 | AIR VOLUME | AIR VOLUME OF INDOOR FAN | ○ | |
| 7 | WIND DIRECTION | INDOOR WIND DIRECTION | | |
| 8 | HUMAN DETECTION SENSOR | PRESENCE OR ABSENCE OR ACTIVITY AMOUNT OF PERSON | ○ | |
| 9 | RADIATION SENSOR | TEMPERATURE OF FLOOR OR WALL | | |
| 10 | INDOOR HEAT EXCHANGE TEMPERATURE | TEMPERATURE OF INDOOR HEAT EXCHANGER | | |
| 11 | OUTDOOR TEMPERATURE | ACTUAL TEMPERATURE OUTSIDE ROOM | ○ | ○ |

FIG.8

(1) TIME STAMP (181001112500) + DATA 1 + DATA 2 + DATA 3····DATA 11
(2) TIME STAMP (181001113000) + DATA 1 + DATA 2 + DATA 3····DATA 11
(3) TIME STAMP (181001113500) + DATA 1 + DATA 2 + DATA 3····DATA 11
(4) TIME STAMP (181001114000) + DATA 1 + DATA 2 + DATA 3····DATA 11
(5)

| RH | \|RH DIFFERENCE\| | |
|---|---|---|
| 45 | 3 OR LESS IS IGNORED | |
| 43 | 0 | |
| 43 | 0 | |
| 43 | 0 | |
| 44 | 0 | |
| 44 | 0 | |
| 44 | 0 | |
| 44 | 0 | |
| 44 | 0 | |
| 44 | 0 | |
| 44 | 0 | |
| 44 | 0 | |
| 48 | 0 | |
| 44 | 0 | |
| 45 | 0 | |
| 46 | 0 | |
| 46 | 0 | |
| 46 | 0 | |
| 46 | 0 | |
| 46 | 0 | |
| 45 | 0 | |
| 44 | 0 | |
| 48 | 0 | |
| 53 | 8 | ← |
| 51 | 0 | |
| 49 | 4 | ← |
| 47 | 0 | |
| 45 | 4 | ← |
| 45 | 0 | |
| 45 | 0 | |
| 46 | 0 | |
| 44 | 0 | |
| 47 | 0 | |
| 50 | 5 | ← |

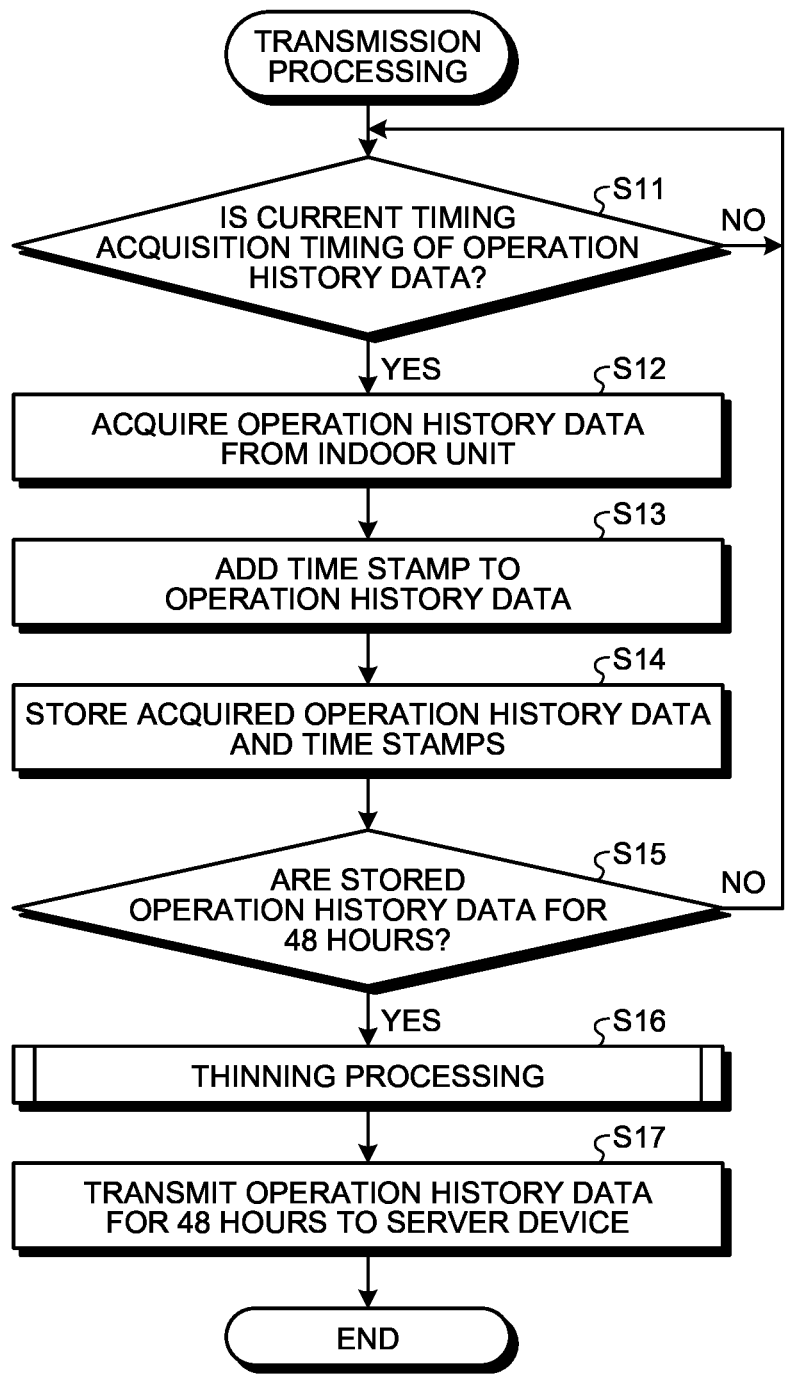

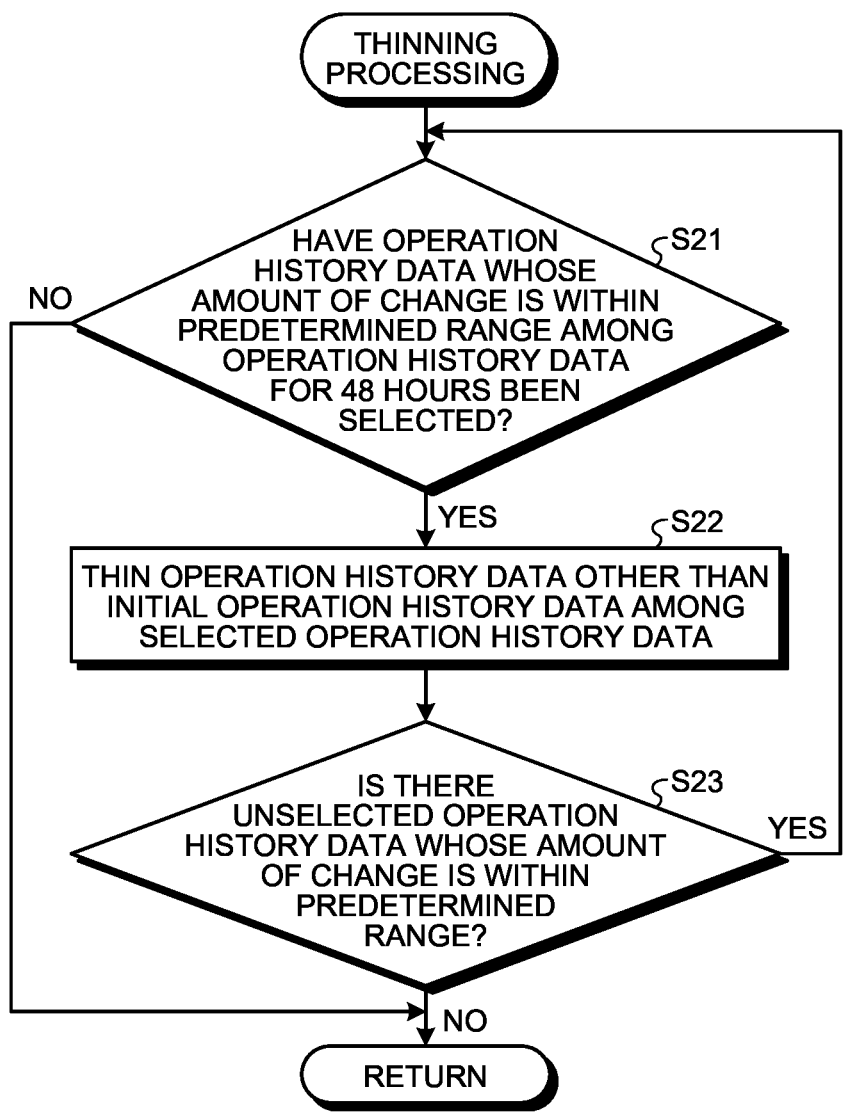

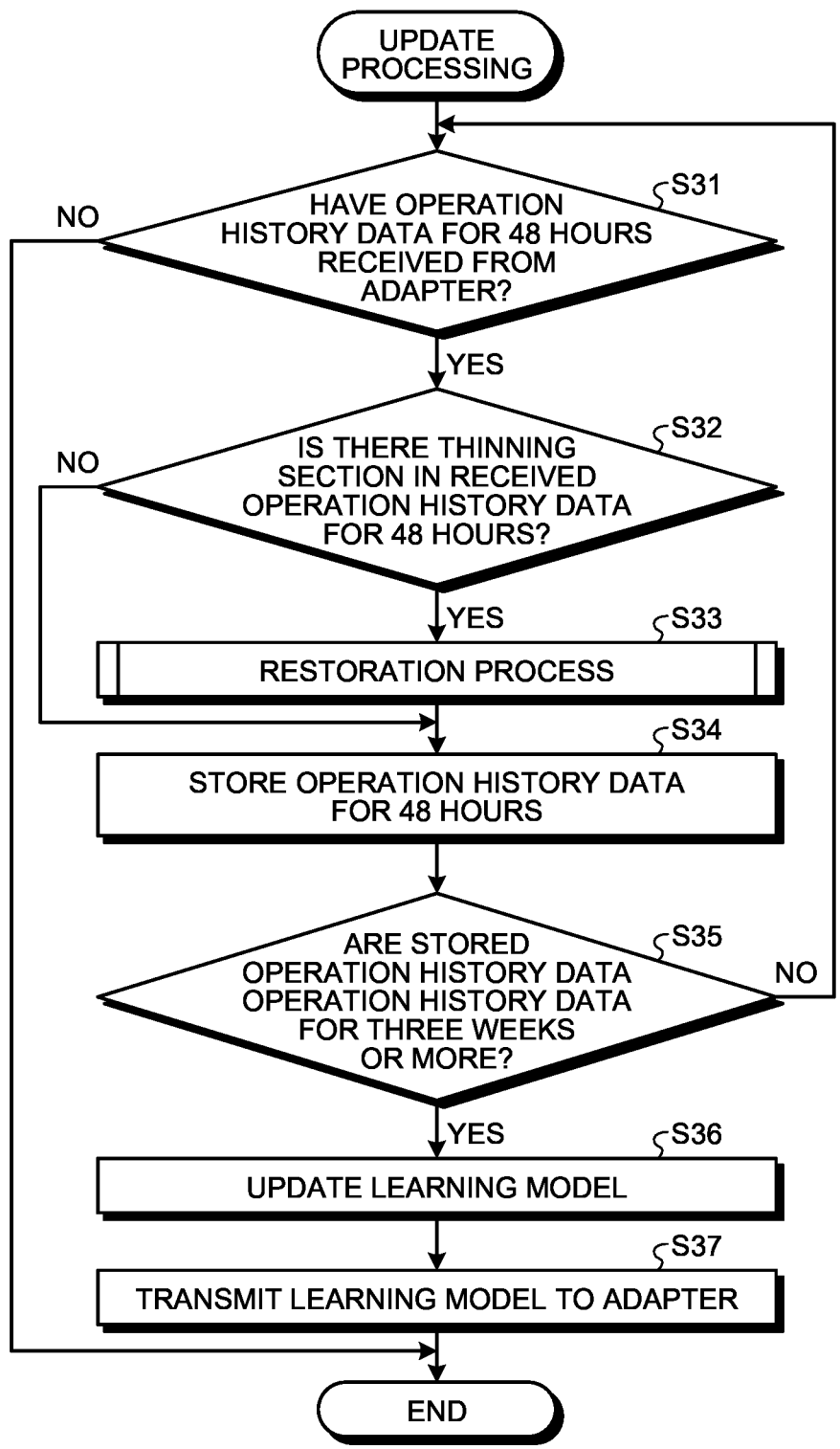

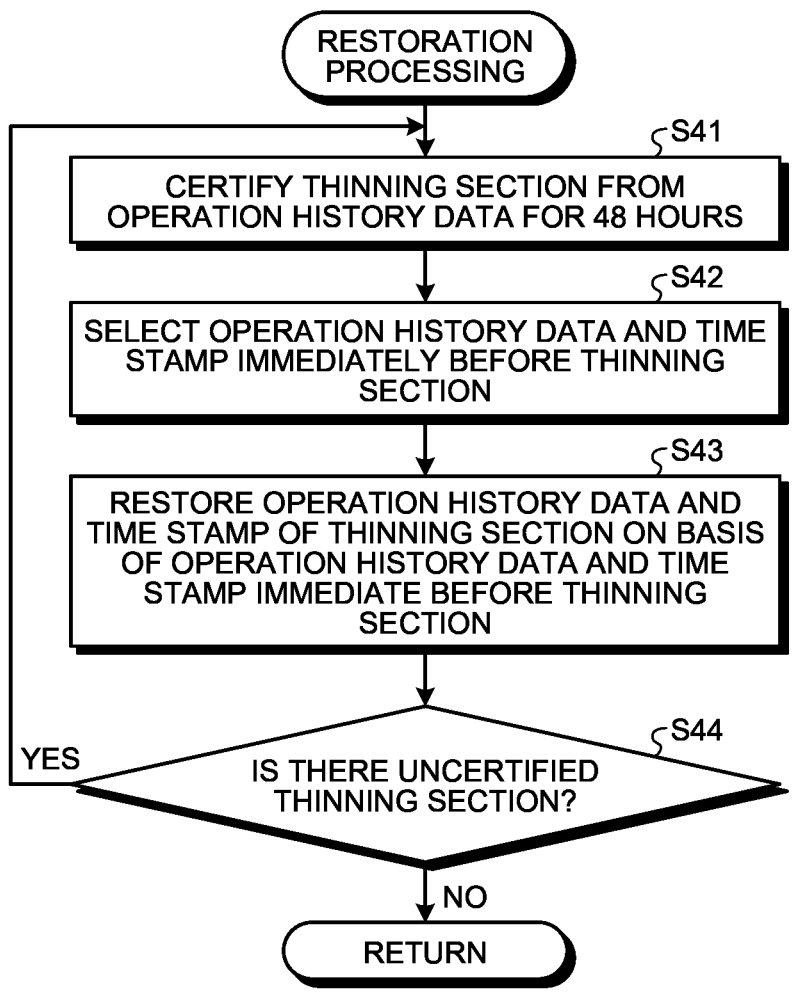

AIR CONDITIONER, DATA TRANSMISSION METHOD, AND AIR CONDITIONING SYSTEM

FIELD

The present invention relates to an air conditioner, a data transmission method, and an air conditioning system.

BACKGROUND

Conventionally, various methods of reducing traffic at the time of transmitting and receiving data between electronic apparatuses have been proposed. For example, there is a method in which a data server performs constant monitoring and accumulates detected data, extracts, compresses, and converts minimum data needed for analysis from a large amount of accumulated data, and transmits the compressed and converted data to an analysis device (for example, Patent Literature 1).

CITATION LIST

Patent Literature

Patent Literature 1: JP 2004-199377 A

SUMMARY

Technical Problem

In recent years, in an air conditioner, it has been proposed to cause artificial intelligence (AI) on a server device, to learn, for example, operation history data such as a set temperature or the like to generate a learning model and control an operation of air conditioning using the learning model. However, in a case where all the operation history data have been transmitted to the server device as they are, an amount of operation history data transmitted from the air conditioner to the server device becomes enormous. As a result, communication traffic between the air conditioner and the server device becomes large.

Meanwhile, if some of the operation history data are simply deleted in order to reduce the communication traffic, operation history data needed for generating the learning model may be insufficient, such that learning accuracy of the AI may be lowered.

The present invention has been made in view of such a problem, and an object of the present invention is to an air conditioner, a data transmission method, and an air conditioning system capable of reducing traffic of data used for learning of artificial intelligence (AI) while maintaining learning accuracy of the AI.

Solution to Problem

According to an aspect, an air conditioner comprises an adapter including a control unit that controls the air conditioner using a learning model and a communication unit that communicates with a server device that generates the learning model on the basis of operation history data of the air conditioner. The adapter includes an acquisition unit, a determination unit, an erasing unit and a transmission unit. The acquisition unit acquires the data every predetermined cycle from the air conditioner. The determination unit determines whether or not an amount of change between temporally continuous data of the data acquired by the acquisition unit is within a predetermined range. The erasing unit leaves at least one of the continuous data and deletes the other data in a case where the amount of change between the continuous data is within the predetermined range. The transmission unit transmits the data after being deleted by the erasing unit to the server device.

Advantageous Effects of Invention

As one aspect, it is possible to reduce traffic of data used for learning of AI while maintaining learning accuracy of the AI.

BRIEF DESCRIPTION OF DRAWINGS

FIG. 6 is an explanatory diagram illustrating an example of contents of operation history data.

FIG. 7 is an explanatory diagram illustrating an example of operation history data used for generating or updating a sensible temperature setting prediction model in summer or winter.

FIG. 8 is an explanatory diagram illustrating an example of thinning processing.

FIG. 9 is an explanatory diagram illustrating an example of a determination operation at the time of determining whether or not an amount of change between operation history data is within a predetermined range.

FIG. 10 is a flowchart illustrating an example of a processing operation of a central processing unit (CPU) in the adapter related to transmission processing.

FIG. 11 is a flowchart illustrating an example of a processing operation of the CPU in the adapter related to thinning processing.

FIG. 12 is a flowchart illustrating an example of a processing operation of a CPU in the server device related to update processing.

FIG. 13 is a flowchart illustrating an example of a processing operation of the CPU in the server device related to restoration processing.

DESCRIPTION OF EMBODIMENTS

Hereinafter, embodiments of an air conditioner, a data transmission method, an air conditioning system, and the like, disclosed in the present application will be described in detail with reference to the drawings. Note that the disclosed technology is not limited by the present embodiment. In addition, each of the embodiments provided below may be appropriately modified as long as it does not cause a contradiction.

Embodiment

Figure 1:
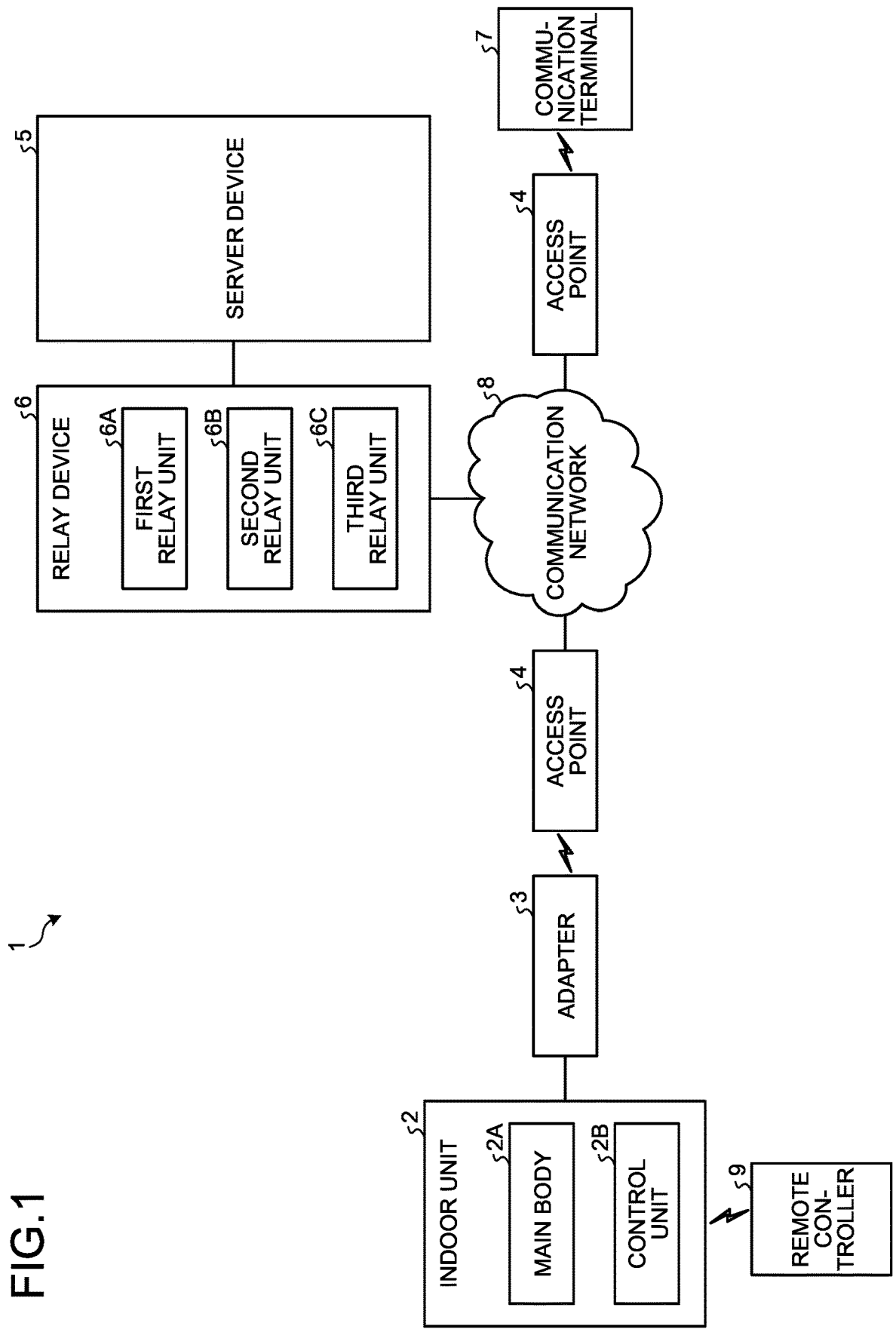
FIG. 1 is an explanatory diagram illustrating an example of an air conditioning system according to the present embodiment.

FIG. 1 is an explanatory diagram illustrating an example of an air conditioning system 1 according to the present embodiment. The air conditioning system 1 illustrated in FIG. 1 includes an indoor unit 2, an adapter 3, an access point 4, a server device 5, a relay device 6, a communication terminal 7, and a communication network 8.

The indoor unit 2 is, for example, a part of an air conditioner that is arranged indoors to heat or cool indoor air. Note that a user of the indoor unit 2 can remotely control the indoor unit 2 by operating a remote controller 9. The indoor unit 2 includes a main body 2A and a control unit 2B that controls the main body 2A. The main body 2A is equipped with an indoor fan or an indoor heat exchanger, and the indoor air that has been heat-exchanged with a refrigerant by the indoor heat exchanger, is blown out from the main body 2A, such that heating, cooling, dehumidification, and the like, of a room are conducted. In addition, an outdoor unit (not illustrated) is provided with an outdoor fan, a compressor or the like. The communication terminal 7 is a terminal device such as a smartphone or the like of the user.

The adapter 3 has a communication function of connecting the indoor unit 2 and the access point 4 to each other by wireless communication, and a control function of controlling the indoor unit 2 by artificial intelligence (AI). The adapter 3 is arranged for each indoor unit 2. The access point 4 is, for example, a device that connects the adapter 3 and the communication network 8 to each other by wireless communication using a wireless local area network (WLAN) or the like. The communication network 8 is, for example, a communication network such as the Internet. The server device 5 has a function of generating a learning model of the AI that controls the indoor unit 2, a database that stores operation history data, or the like. Note that the server device 5 is arranged in, for example, a data center. The relay device 6 has a function of connecting to the communication network 8 by communication and also connecting to the server device 5 by communication. The relay device 6 transmits the operation history data or the like used for generating or updating the learning model applied to the indoor unit 2 from the adapter 3 to the server device 5 via the communication network 8. In addition, the relay device 6 transmits the learning model generated or updated by the server device 5 to the adapter 3 via the communication network 8. Note that the relay device 6 is arranged in, for example, the data center or the like.

The relay device 6 has a first relay unit 6A, a second relay unit 6B, and a third relay unit 6C. The first relay unit 6A transmits various data related to AI control between the adapter 3 and the server device 5. The first relay unit 6A transmits the operation history data or the like used for generating or updating the learning model received from the adapter 3 to the server device 5 via the communication network 8, and transmits the learning model generated or updated by the server device 5 to the adapter 3 via the communication network 8. The second relay unit 6B acquires an operation condition (an operation mode such as cooling/heating, a set temperature, or the like) of the indoor unit 2 set by the user using the communication terminal 7 from the outside, and transmits the operation condition to the indoor unit 2. The third relay unit 6C acquires, for example, external data such as a weather forecast or the like from the communication network 8 such as the Internet or the like, and transmits the acquired external data to the server device 5. In addition, the third relay unit 6C transmits the external data to the adapter 3 via the communication network 8.

Figure 2:
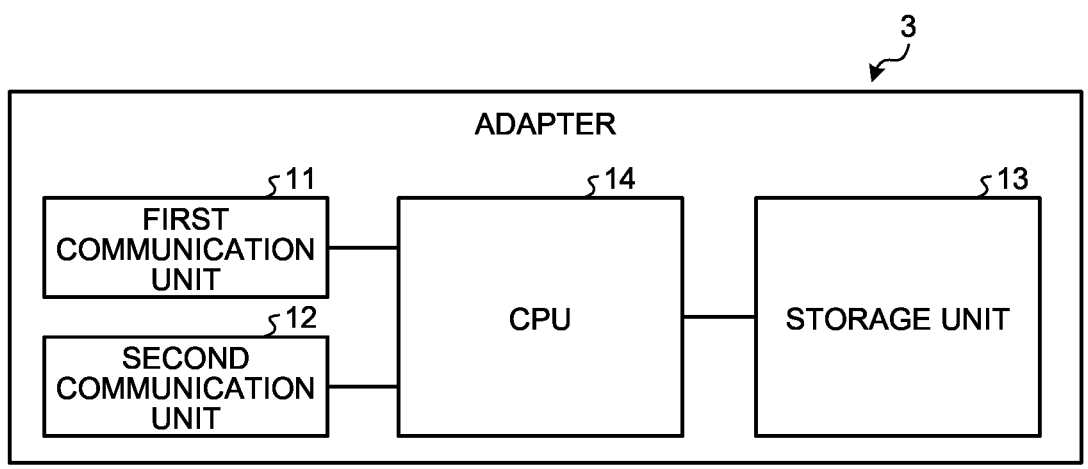
FIG. 2 is a block diagram illustrating an example of a hardware configuration of an adapter.

FIG. 2 is a block diagram illustrating an example of a hardware configuration of the adapter 3. The adapter 3 illustrated in FIG. 2 includes a first communication unit 11, a second communication unit 12, a storage unit 13, and a central processing unit (CPU) 14. The first communication unit 11 is a communication interface (IF) such as a universal asynchronous receiver transmitter (UART) or the like that connects to the control unit 2B in the indoor unit 2 by communication. The second communication unit 12 is, for example, a communication unit such as a communication IF or the like such as a WLAN or the like, that connects to the access point 4 by communication. The storage unit 13 has, for example, a read only memory (ROM), a random access memory (RAM) or the like, and stores various information such as data, programs or the like. The CPU 14 controls the entire adapter 3.

Figure 3:
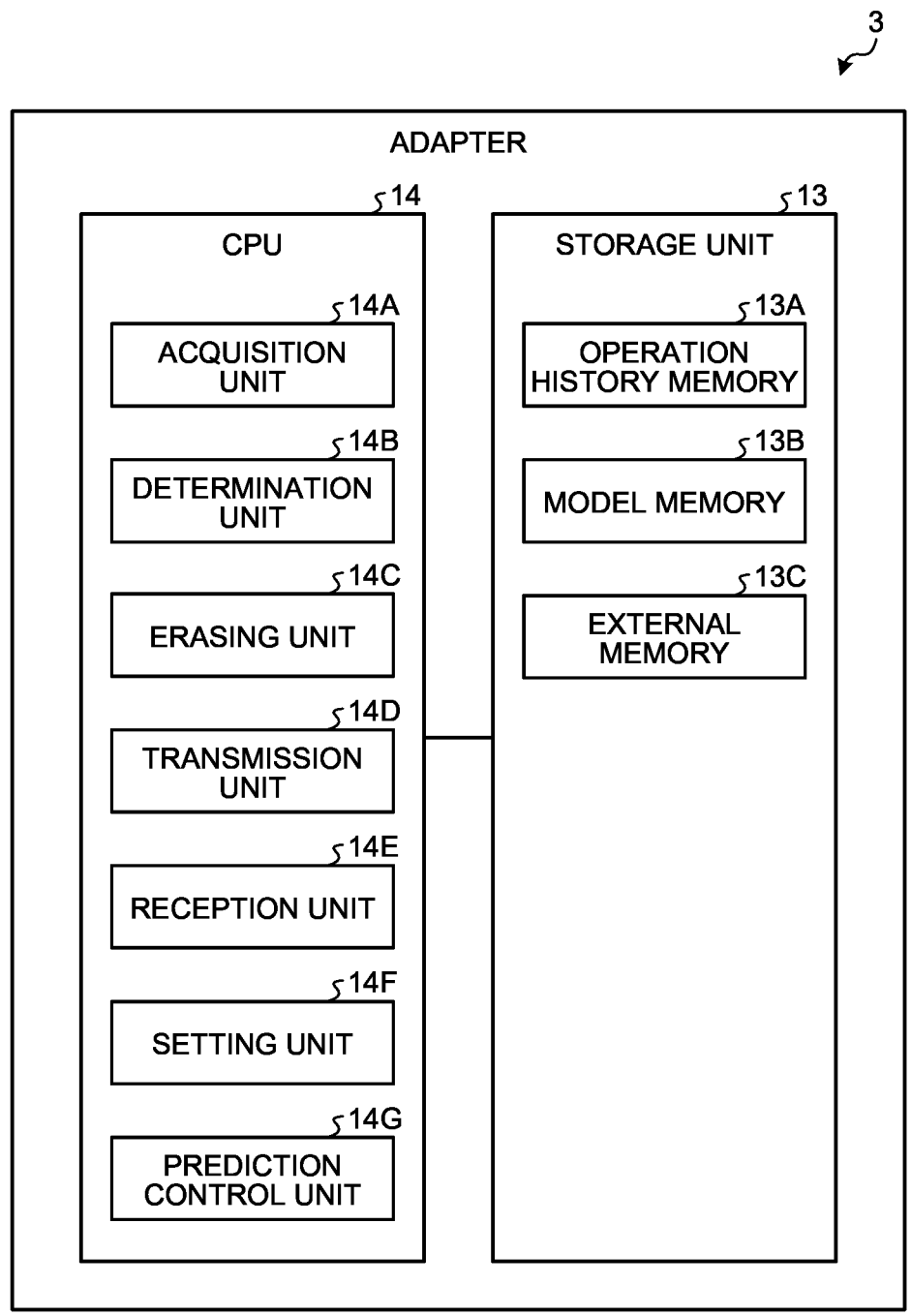
FIG. 3 is a block diagram illustrating an example of a functional configuration of the adapter.

FIG. 3 is a block diagram illustrating an example of a functional configuration of the adapter 3. The storage unit 13 in the adapter 3 illustrated in FIG. 3 includes an operation history memory 13A that temporarily stores the operation history data acquired from the indoor unit 2, a model memory 13B that stores the learning model acquired from the server device 5, and an external memory 13C that stores external data.

The CPU 14 includes an acquisition unit 14A, a determination unit 14B, an erasing unit 14C, a transmission unit 14D, a reception unit 14E, a setting unit 14F, and a prediction control unit 14G.

The acquisition unit 14A acquires operation history data and time stamps every five minutes from the indoor unit 2 at an acquisition timing every predetermined cycle, for example every five minutes. The acquisition unit 14A stores the operation history data acquired every five minutes and the time stamps given to the operation history data in the operation history memory 13A.

The determination unit 14B determines whether or not an amount of change between temporally continuous operation history data of the acquired operation history data is within a predetermined range in a case where the operation history data and the time stamps given to the operation history data stored in the operation history memory 13A are those for a predetermined period. Note that the predetermined period is 48 hours, for example, in a case where the learning model is a sensible temperature setting prediction model or the like to be described later. Note that the 48 hours are, for example, a time in which a memory capacity of the adapter 3 and avoidance of concentration of communication have been considered. The determination unit 14B determines whether or not the operation history data stored in the operation history memory 13A are operation history data for 48 hours acquired every five minutes. In a case where the operation history data stored in the operation history memory 13A are the operation history data for 48 hours, the determination unit 14B determines whether or not an amount of change between continuous operation history data of the operation history data for 48 hours is within a predetermined range. The amount of change between the continuous operation history data is a difference amount in change between preceding and succeeding operation history data continuous temporally. A case where the amount of change between the preceding and succeeding operation history data is within a predetermined range is, for example, a case where the amount of change between the preceding and succeeding operation history data is within a range of an amount of change that does not affect learning of AI, for example, there is no amount of change or the amount of change is within a range that can be ignored in the learning of the AI. The range of the amount of change that does not affect the learning of the AI is a range that does not affect a human bodily sensation even though the indoor unit 2 is controlled using a result of the learning of the AI based on the preceding and succeeding operation history data. Generally, it is needed that there is no amount of change between data in order to secure reproduction of data, time stamps given to the data, and data deleted at the time of compression. In addition, it is more difficult for a person to bodily sense a change in humidity than a change in temperature in an environment, and a width considered to be the same value is wider in humidity than in temperature. For example, the person tends to be less likely to sense a change in humidity of ±1% than a change in temperature of ±1° C. Therefore, even though an amount of change at the time of determining the data is coarser in a case where the operation history data are the humidity than in a case where the operation history data are the temperature, it is considered that a human bodily sensation is not affected even though the indoor unit 2 is controlled using a result of learning of AI based on these data, such that, for example, a weighting of the humidity with respect to the temperature at a sensible temperature is not a relationship of 1:1, and is a relationship of, for example, (temperature:humidity)=1:5. A change in humidity of ±5% is considered to be the same because it is not a change that affects the human bodily sensation, for example, in a case where the indoor unit 2 is controlled using the result of the learning of the AI. As a result, an amount of data to be transmitted can be reduced.

In a case where the amount of change between the continuous operation history data is within the predetermined range, the determination unit 14B decides that the continuous operation history data are data within the range that does not affect the human bodily sensation in a case where the indoor unit 2 has been controlled using the result of the learning of the AI. Note that the data within the range that does not affect the human bodily sensation in a case where the indoor unit 2 has been controlled by using the result of the learning of the AI are, for example, target data to be deleted (that may be described as "thinned" in the following description). In a case where the amount of change between the continuous operation history data is not within the predetermined range, the determination unit 14B decides that the continuous operation history data are data that affect the human bodily sensation in a case where the indoor unit 2 has been controlled using the result of the learning of the AI. Note that the data that affect the human bodily sensation in a case where the indoor unit 2 has been controlled using the result of the learning of the AI are not target data to be thinned.

In a case where an amount of change between respective operation history data in continuous time stamps is within a predetermined range, the erasing unit 14C leaves one operation history data and a time stamp given to the one operation history data, and thins the other operation history data and time stamps given to the other operation history data. Then, the erasing unit 14C sequentially stores the operation history data for 48 hours after the thinning in the operation history memory 13A. For example, in a case where the operation history data whose amount of change is within a predetermined range have been continuous from 12:00 to 12:15, the erasing unit 14C leaves operation history data at 12:00, which has the oldest time stamp, and thins operation history data at 12:05, 12:10, and 12:15 and time stamps given to the operation history data. However, in a case where an amount of change between non-continuous operation history data of the operation history data for 48 hours is within a predetermined range, it is assumed that the operation history data whose amount of change is within the predetermined range are not thinned.

The transmission unit 14D transmits the operation history data after the thinning and the time stamps given to the operation history data stored in the operation history memory 13A to the server device 5 via the communication network 8. The reception unit 14E receives the learning model from the server device 5 via the communication network 8, and stores the received learning model in the model memory 13B. The setting unit 14F applies the stored learning model to the prediction control unit 14G. The prediction control unit 14G controls the control unit 2B in the indoor unit 2 on the basis of the learning model applied by the setting unit 14F. Note that a case where the prediction control unit 14G controls the control unit 2B in the indoor unit 2 on the basis of the learning model has been exemplified for convenience of explanation, but the prediction control unit 14G may directly control the main body 2A of the indoor unit 2 on the basis of the learning model. In addition, the prediction control unit 14G transmits a control mode based on the learning model to the control unit 2B. That is, the prediction control unit 14G may indirectly control the main body 2A via the control unit 2B, and can be appropriately changed.

Figure 4:
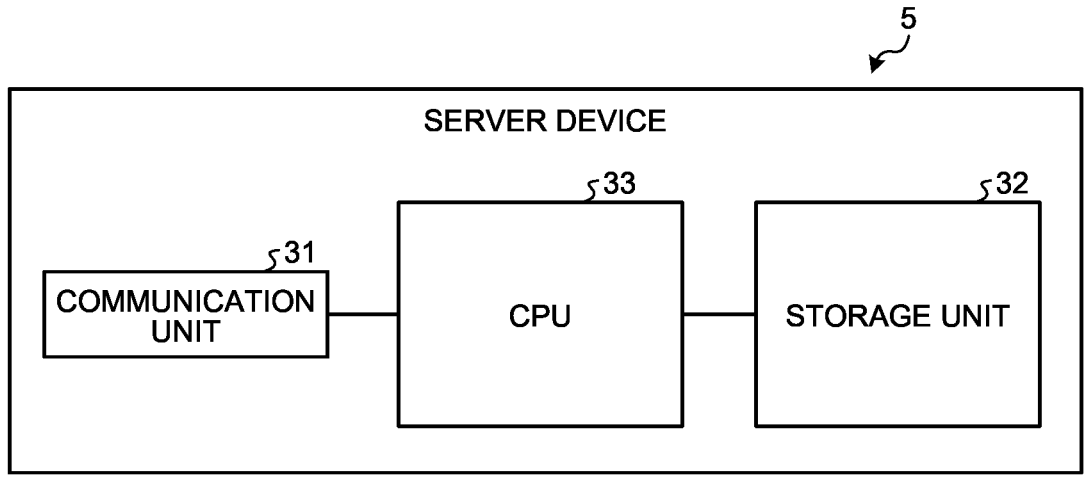
FIG. 4 is a block diagram illustrating an example of a hardware configuration of a server device.

FIG. 4 is a block diagram illustrating an example of a hardware configuration of the server device 5. The server device 5 illustrated in FIG. 4 includes a communication unit 31, a storage unit 32, and a CPU 33. The communication unit 31 is a communication IF that connects to the relay device 6 by communication. The storage unit 32 has, for example, a hard disk drive (HDD), a ROM, a RAM, or the like, and stores various information such as data, programs or the like. The CPU 33 controls the entire server device 5.

Figure 5:
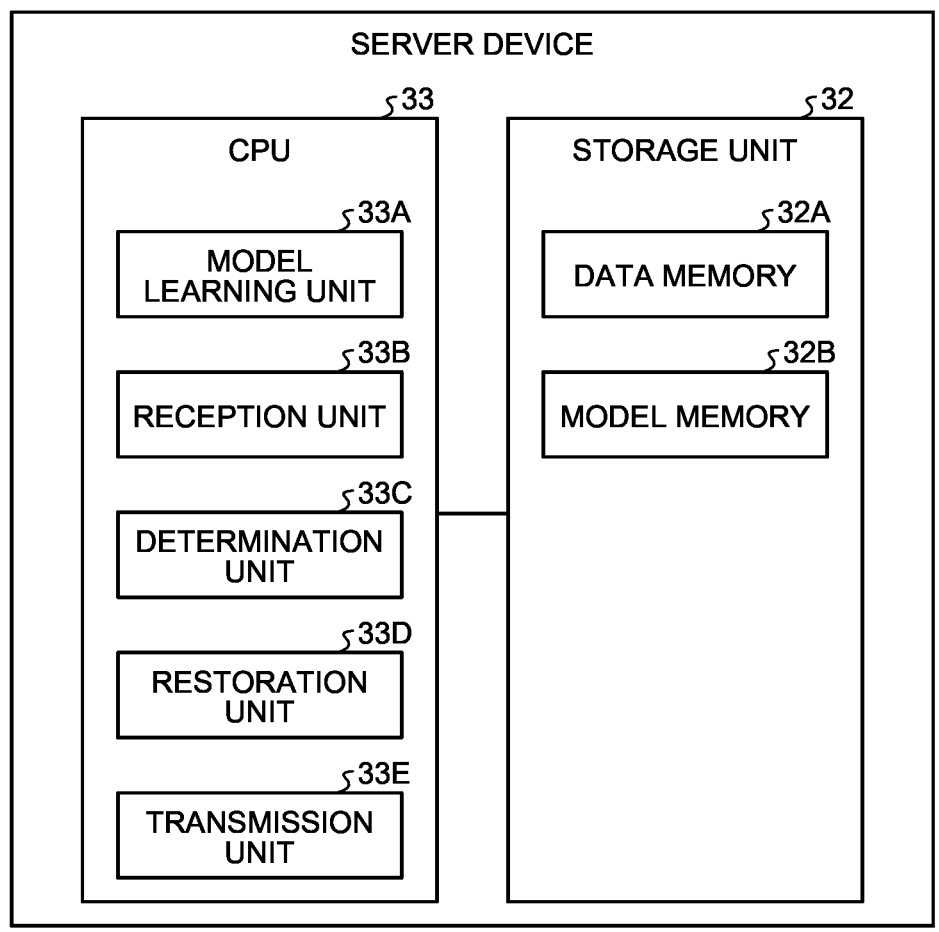
FIG. 5 is a block diagram illustrating an example of a functional configuration of the server device.

FIG. 5 is a block diagram illustrating an example of a functional configuration of the server device 5. The storage unit 32 in the server device 5 illustrated in FIG. 5 includes a data memory 32A and a model memory 32B. The data memory 32A stores the operation history data received from each adapter 3 and the time stamps given to the operation history data, and the like. The model memory 32B stores the learning model generated or updated by the server device 5.

The CPU 33 in the server device 5 includes a model learning unit 33A, a reception unit 33B, a determination unit 33C, a restoration unit 33D, and a transmission unit 33E.

The model learning unit 33A connects to each adapter 3 of a plurality of indoor units 2 to receive the operation history data for 48 hours from each adapter 3 via the access point 4, the communication network 8, and the relay device 6. Then, the model learning unit 33A learns using the operation history data for 48 hours stored in the data memory 32A from each adapter 3, and generates or updates the learning model of each indoor unit 2 on the basis of a learning result. The learning model includes, for example, a sensible temperature setting prediction model that predicts a sensible temperature after five minutes for an indoor user according to an operation situation of an air conditioner in each household and controls the air conditioner according to the predicted sensible temperature. Conventionally, the air conditioner adjusts a temperature so that an indoor temperature reaches a target temperature, and the user may thus feel bodily that a temperature change is uncomfortable. On the other hand, the sensible temperature setting prediction model is, for example, a program executed at the time of adjusting the air conditioner so that the user feels comfortable according to time-series operation history data such as an indoor temperature, an indoor humidity, an outdoor temperature, and the like. Then, the model learning unit 33A stores the generated or updated learning model in the model memory 32B. The reception unit 33B receives the operation history data, the time stamps given to the operation history data, and the like, from each adapter 3 via the communication network 8. Note that a case where the model learning unit 33A generates or updates the learning model of the sensible temperature setting prediction model using, for example, the operation history data for 48 hours has been exemplified for convenience of explanation. However, the model learning unit 33A is not limited to using the operation history data for 48 hours, may use operation history data for, for example, one month, a half year or the like according to a content of the learning model, and can be appropriately changed.

The determination unit 33C refers to the operation history data for 48 hours received from the adapter 3 and the time stamps given to the operation history data for 48 hours, and determines whether or not there is a thinning section from the operation history data for 48 hours on the basis of the presence or absence of the time stamp.

In a case where it is determined that there is a thinning section, the restoration unit 33D decides that a section in which there is no time stamp is the thinning section in which the operation history data are thinned because the time stamp has a cycle of five minutes. Further, the restoration unit 33D restores the operation history data for 48 hours and the time stamps given to the operation history data for 48 hours by generating operation history data of the thinning section and the time stamp given to the operation history data of the thinning section on the basis of operation history data immediately before the thinning section and a time stamp given to the operation history data immediately before the thinning section. Then, the restoration unit 33D stores the operation history data for 48 hours after the restoration and the time stamps given to the operation history data for 48 hours after the restoration in the data memory 32A. For example, in a case where an amount of change between operation history data from 12:00 to 12:15 on an adapter 3 side is within a predetermined range, the restoration unit 33D refers to the presence or absence of the time stamp. In a case where there is no time stamp in a section from 12:05 to 12:15, the restoration unit 33D decides that the section from 12:05 to 12:15 is the thinning section. For example, in a case where the restoration unit 33D decides that the section from 12:05 to 12:15 is the thinning section, operation history data at 12:00 becomes the operation history data immediately before the thinning section. Therefore, the restoration unit 33D restores the operation history data of the thinning section and the time stamp given to the operation history data of the thinning section by copying the operation history data at 12:00 as operation history data at 12:05, 12:10 and 12:15. Then, the restoration unit 33D stores the operation history data after the restoration and the time stamps given to the operation history data after the restoration in the data memory 32A. As a result, the restoration unit 33D stores the operation history data for 48 hours and the time stamps given to the operation history data for 48 hours in the data memory 32A by restoring the operation history data of the thinning section and the time stamp given to the operation history data of the thinning section among the operation history data for 48 hours received from the adapter 3 and the time stamps given to the operation history data for 48 hours. Note that since the restoration of the time stamp is stamped in units of a predetermined cycle (cycle of five minutes), for example, the time stamp of the thinning section can be restored by incrementing the time stamp immediately before the thinning section by +5 minutes.

The model learning unit 33A generates or updates the learning model corresponding to the adapter 3 on the basis of the operation history data for 48 hours for each adapter 3 and the time stamps given to the operation history data for 48 hours stored in the data memory 32A, and stores the generated or updated learning model in the model memory 32B. The transmission unit 33E transmits the learning model generated or updated by the model learning unit 33A to the adapter 3 via the relay device 6, the communication network 8, and the access point 4.

FIG. 6 is an explanatory diagram illustrating an example of contents of the operation history data. The operation history data includes, for example, an operation state, an operation mode, a set temperature, an indoor temperature, an indoor humidity, an air volume, a wind direction, a human detection sensor, a radiation sensor, an indoor heat exchange temperature, an outdoor temperature, the number of revolutions of a compressor, an outdoor air volume, an operation current, an outdoor heat exchange temperature, and the like. Further, the operation history data includes, for example, a discharge temperature, a compressor temperature, an expansion valve opening degree, a radiator temperature, a start failure history, an abnormal stop history, an emergency operation history, a time stamp, an air conditioner ID, an installation place, a facility type, or the like.

The operation state is an ON-OFF state of an operation of the indoor unit 2. The operation mode is an operation mode such as cooling, heating or the like of the indoor unit 2. The set temperature is an indoor target temperature inside a room where the indoor unit 2 is used. The indoor temperature is an actual temperature inside the room where the indoor unit 2 is used. The indoor humidity is an actual humidity inside the room where the indoor unit 2 is used. The air volume is an air volume of conditioned air blown out from the indoor unit 2. The wind direction is a wind direction of the conditioned air blown out from the indoor unit 2. The human detection sensor is a detection result of the presence or absence or an activity amount of a person inside the room by the sensor. The radiation sensor is a detection result of a temperature of a floor or a wall inside the room by the sensor. The indoor heat exchange temperature is a temperature of an indoor heat exchanger (not illustrated) that forms a part of the main body 2A of the indoor unit 2. The outdoor temperature is an actual temperature outside the room. The number of revolutions of the compressor is the number of operation revolutions of the compressor provided in an outdoor unit (not illustrated) connected to the indoor unit 2 by a refrigerant pipe. The outdoor air volume is an air volume of an outdoor fan provided in the outdoor unit. The operation current is, for example, an operation current of the entire air conditioner such as the indoor unit 2, the outdoor unit and the like. The outdoor heat exchange temperature is a temperature of an outdoor heat exchanger provided in the outdoor unit. The discharge temperature is a temperature of a refrigerant discharged from the compressor. The compressor temperature is a temperature at a bottom of the compressor. The expansion valve opening degree is an opening degree of an electronic expansion valve provided in the outdoor unit. The radiator temperature is a temperature of a power semiconductor that drives and controls the compressor. The start failure history is a history of a compressor start failure. The abnormal stop history is a history of an abnormal stop. The emergency operation history is an execution history of an emergency operation. The time stamp is the year, month, day, hour, minute, and second at the time of data acquisition. The air conditioner ID is an ID given to the indoor unit 2 in order to identify the air conditioner such as the indoor unit 2 or the like. The installation place is an address of a place where the air conditioner is installed. The facility type is a type of facility such as a store, a restaurant, a factory, or the like, in which the air conditioner such as the indoor unit 2 or the like is installed.

The operation history data includes data used for a household air conditioner and data used for a commercial air conditioner. The operation history data used for the household air conditioner use includes, for example, an operation state, an operation mode, a set temperature, an indoor temperature, an indoor humidity, an air volume, a wind direction, a value detected by a human detection sensor, a value detected by a radiation sensor, a time stamp, an air conditioner ID, an installation place, and the like. In the household air conditioner, an operation or a proposal is performed using AI in pursuit of a comfortable property or an energy saving property. Therefore, for example, a set temperature, an operation mode, an indoor or ambient environment, and the like, are data needed for the household air conditioner.

In addition, the operation history data used for the commercial air conditioner includes, for example, an operation state, an operation mode, a set temperature, an indoor temperature, an indoor humidity, an air volume, a wind direction, a value detected by a human detection sensor, a value detected by a radiation sensor, an indoor heat exchange temperature, an outdoor temperature, the number of revolutions of a compressor, an outdoor air volume, an operation current, an outdoor heat exchange temperature, and the like. Further, the other operation history data includes, for example, a discharge temperature, a compressor temperature, an expansion valve opening degree, a radiator temperature, a start failure history, an abnormal stop history, an emergency operation history, a time stamp, an air conditioner ID, an installation place, a facility type, or the like. In the commercial air conditioner, the AI predicts a failure or a necessity for maintenance of each device. Therefore, for example, operation situations or histories of each component level in the air conditioner used for failure prediction are accumulated, and a sign of failure is determined by the AI. In addition to the above, the operation history data needed for the commercial air conditioner is, for example, data used for failure prediction. Note that since the number of revolutions, or the like, of a compressor or a fan motor used in the air conditioner is stopped and each operation history data is not generated while the air conditioner is stopped, data such as, for example, the number of revolutions of the compressor, the outdoor air volume, the operation current, the outdoor heat exchange temperature, and the like, will not be acquired while the air conditioner is stopped.

In a case where the learning model is, for example, the sensible temperature setting prediction model described above, time-series operation history data such as the set temperature, the indoor temperature, the indoor humidity, the outdoor temperature, and the like, are used for generating or updating the sensible temperature setting prediction model. FIG. 7 is an explanatory diagram illustrating an example of operation history data used for generating or updating a sensible temperature setting prediction model in summer or winter. The operation history data used in the sensible temperature setting prediction model differs depending on, for example, a season, as illustrated in FIG. 7. For example, in a winter sensible temperature setting prediction model, a set temperature, an indoor temperature, an indoor humidity, an outdoor temperature, and the like, are used. On the other hand, in a summer sensible temperature setting prediction model, in addition to the set temperature, the indoor temperature, the indoor humidity, the outdoor temperature, and the like, for example, an air volume and detection data (presence or absence or an activity amount of a person) of a human detection sensor are added.

As described above, the operation history data are acquired, for example, every 5 minutes. In a case where the respective operation history data corresponding to the continuous time stamps are the same as each other, the time stamps and the operation history data are thinned. At this time, a predetermined range of an amount of change at the time of thinning the time stamps and the operation history data is set according to characteristics of each operation history data. Note that the predetermined range of the amount of change at the time of determining the operation history data corresponds to a width of a threshold value for determining the presence or absence of a change between the continuous operation history data, and changes depending on, for example, summer or winter.

The predetermined range of the amount of change for each data at the time of determining, for example, the operation state, the operation mode, the set temperature, the indoor temperature, the indoor humidity, the air volume, the wind direction, the value detected by the human detection sensor, the value detected by the radiation sensor, the indoor heat exchange temperature, and the outdoor temperature is not limited to, for example, the summer or the winter, and may be changed or the same depending on other times, an installation environment of the air conditioner, or a setting history of the air conditioner.

FIG. 8 is an explanatory diagram illustrating an example of thinning processing. The CPU 14 of the adapter 3 acquires, for example, operation history data from data 1 to data 11 from the indoor unit 2 every five minutes, as illustrated in FIG. 8. For example, in a case where an amount of change between respective operation history data of data 1 to data 11 of each of a time stamp (181001113000) and a time stamp (181001113500) is within a predetermined range, the CPU 14 thins each operation history data of the time stamp (181001113500) as being the same as each operation history data of the time stamp (181001113000). On the other hand, in a case where there is even one operation history data whose amount of change is not within the predetermined range among respective operation history data of data 1 to data 11 of each of the time stamp (181001113500) and a time stamp (181001114000), the CPU 14 does not thin these operation history data, and transmits all the operation history data to the server device 5. As a result, when the operation history data are uploaded to the server device 5, a compression efficiency is increased because original data are thinned, and communication traffic can be reduced due to the increase in the compression efficiency.

FIG. 9 is an explanatory diagram illustrating an example of a determination operation at the time of determining whether or not an amount of change between operation history data is within a predetermined range, and here, the indoor humidity of the respective operation history data illustrated in FIG. 7 is taken as an example. Accuracy of a humidity sensor used in the air conditioner is about ±5%. A relative humidity inside the room may fluctuate greatly even with opening or closing or the like of a door inside the room. Since it is more difficult to bodily sense the change in humidity than the change in temperature as described above, a predetermined range of an amount of change in room temperature and a predetermined range of an amount of change in indoor humidity are changed using such a difference in the bodily sensation. In addition, not only the predetermined ranges of the amounts of change in the room temperature and the indoor humidity may be changed, but also a predetermined range of an amount in change may be changed according to a season such as winter, summer or the like. In summer, a dehumidification operation is selected in addition to cooling and a humidity is controlled in the dehumidification operation, whereas in winter, there is no operation mode of controlling a humidity. Therefore, a predetermined range of an amount of change in humidity in winter may be made larger than a predetermined range of an amount of change in humidity in summer. For example, in a case of summer, in a case where an amount of change in indoor humidity is within a predetermined range, for example, ±3%, it may be decided that there is no change, and in a case of winter, in a case where an amount of change in indoor humidity is within a predetermined range, for example, ±5%, it may be decided that there is no change.

The explanatory diagram illustrated in FIG. 9 is data of an indoor humidity acquired every five minutes. At a start point in time illustrated in FIG. 9, an indoor humidity (RH) is 45%. Thereafter, a state in which an amount of change in the indoor humidity is within a predetermined range, for example, ±3% continues. However, at a point in time when the indoor humidity has become 53%, an amount of change in the indoor humidity from 45% is a change of +8%, that is, the amount of change in the indoor humidity was no longer within the predetermined range, such that it is decided that there is a change, and a criterion is set to 53%. Thereafter, at a point in time when the indoor humidity has become 49%, an amount of change in the indoor humidity from 53% is a change of −4%, that is, the amount of change in the indoor humidity was no longer within the predetermined range, such that it is decided that there is a change, and a criterion is set to 49%. Further, at a point in time when the indoor humidity has become 45%, an amount of change in the indoor humidity from 49% is a change of 4%, that is, the amount of change in the indoor humidity was no longer within the predetermined range, such that it is decided that there is a change, and a criterion is set to 45%. Further, at a point in time when the indoor humidity has become 50%, an amount of change in the indoor humidity from 45% is a change of +5%, that is, the amount of change in the indoor humidity was no longer within the predetermined range, such that it is decided that there is a change, and a criterion is set to 50%. Note that similar to a case of the humidity, also in other operation history data, it is decided whether or not there is a change in other operation history data by setting a predetermined range for determining the presence or absence of a change according to characteristics of each data and other operation history data are thinned in a case where there is the same time stamp in which an amount of change in each data in all the operation history data is within the predetermined range.

For example, in the sensible temperature setting prediction model or the like, the acquisition unit 14A in the adapter 3 acquires operation history data such as a set temperature, an indoor temperature, an indoor humidity, an outdoor temperature, or the like, from the indoor unit 2 every five minutes, and stores the acquired operation history data in the operation history memory 13A. The determination unit 14B in the adapter 3 determines whether or not the operation history data stored in the operation history memory 13A are operation history data for 48 hours.

In a case where the operation history data stored in the operation history memory 13A are the operation history data for 48 hours, the determination unit 14B determines whether or not an amount of change between continuous operation history data, for example, an amount of change between each operation history data at 12:00 and each operation history data at 12:05 is within a predetermined range. Note that it is assumed that the amount of change between the continuous operation history data does not include, for example, a time stamp. In a case where the amount of change between the operation history data is within the predetermined range, the erasing unit 14C in the adapter 3 thins the operation history data whose amount of change is within the predetermined range. Further, the transmission unit 14D in the adapter 3 transmits the operation history data for 48 hours after the thinning to the server device 5 via the access point 4, the communication network 8, and the relay device 6.

In a case where the operation history data for 48 hours are received, the determination unit 33C in the server device 5 determines whether or not there is a thinning section in the operation history data. In a case where there is a thinning section in the operation history data for 48 hours, the restoration unit 33D in the server device 5 refers to the time stamp and decides that a section in which there is no time stamp is the thinning section. Further, the restoration unit 33D restores operation history data of the thinning section and a time stamp given to the operation history data of the thinning section on the basis of operation history data immediately before the thinning section and a time stamp given to the operation history data immediately before the thinning section. The restoration unit 33D stores the operation history data after the restoration and the time stamps given to the operation history data in the data memory 32A. For example, in a case where the restoration unit 33D decides that the section from 12:05 to 12:15 is the thinning section, operation history data at 12:00 becomes the operation history data immediately before the thinning section. Therefore, the restoration unit 33D restores the operation history data of the thinning section and the time stamp given to the operation history data of the thinning section by copying the operation history data at 12:00 as operation history data at 12:05, 12:10 and 12:15. The model learning unit 33A in the server device 5 generates or updates the learning model such as the sensible temperature setting prediction model or the like on the basis of the operation history data stored in the data memory 32A and the time stamps given to the operation history data. Then, the transmission unit 33E in the server device 5 transmits the learning model such as the sensible temperature setting prediction model or the like generated or updated by the model learning unit 33A to the adapter 3 via the relay device 6, the communication network 8, and the access point 4.

In a case where the learning model such as the sensible temperature setting prediction model or the like is received from the server device 5, the setting unit 14F in the adapter 3 stores the learning model in the model memory 13B. Then, the prediction control unit 14G in the adapter 3 controls the control unit 2B in the indoor unit 2 on the basis of the learning model such as the sensible temperature setting prediction model or the like stored in the model memory 13B, for example, when the indoor temperature is stably controlled at the set temperature ±1.5° C. Note that a case where the prediction control unit 14G controls the control unit 2B in the indoor unit 2 on the basis of the learning model has been exemplified for convenience of explanation, but the prediction control unit 14G may directly control the main body 2A of the indoor unit 2 on the basis of the learning model. In addition, the prediction control unit 14G may transmit the control mode based on the learning model to the control unit 2B and control the main body 2A via the control unit 2B, and can be appropriately changed. That is, the prediction control unit 14G may directly control the main body 2A or indirectly control the main body 2A using the control unit 2B, and can be appropriately changed.

Next, an operation of the air conditioning system 1 according to the present embodiment will be described. FIG. 10 is a flowchart illustrating an example of a processing operation of the CPU 14 in the adapter 3 related to transmission processing. The acquisition unit 14A in the CPU 14 in the adapter 3 determines whether or not a current timing is an acquisition timing of operation history data (Step S11). Note that the acquisition timing has, for example, a cycle of five minutes. In a case where the current timing is the acquisition timing of the operation history data (Step S11 Yes), the acquisition unit 14A acquires the operation history data from the indoor unit 2 (Step S12). Further, the acquisition unit 14A adds a time stamp to the operation history data (Step S13).

The acquisition unit 14A stores the acquired operation history data and the time stamps given to the operation history data in the operation history memory 13A (Step S14). The determination unit 14B in the CPU 14 determines whether or not the operation history data stored in the operation history memory 13A are operation history data for 48 hours (Step S15). Note that the determination unit 14B determines, for example, whether or not there are operation history data for 48 hours by counting the time stamps having a cycle of five minutes.

In a case where the operation history data stored in the operation history memory 13A are the operation history data for 48 hours (Step S15 Yes), the determination unit 14B executes thinning processing illustrated in FIG. 11 to be described later (Step S16). The erasing unit 14C in the CPU 14 stores the operation history data for 48 hours and the time stamps given to the operation history data for 48 hours in the operation history memory 13A after the thinning processing is executed, transmits the stored operation history data for 48 hours and time stamps given to the operation history data for 48 hours to the server device 5 (Step S17), and ends the processing operation illustrated in FIG. 10. Note that after the operation history data for 48 hours and the time stamps given to the operation history data for 48 hours are transmitted to the server device 5, the acquisition unit 14A sequentially acquires the next operation history data for 48 hours and time stamps given to the next operation history data for 48 hours without overlapping the data after the transmission.

In a case where the current timing is not the acquisition timing of the operation history data acquisition timing (Step S11 No), the acquisition unit 14A returns to the processing of Step S11. In a case where the operation history data stored in the operation history memory 13A are not the operation history data for 48 hours (Step S15 No), the acquisition unit 14A returns to the processing of Step S11.

As described above, the adapter 3 acquires the operation history data from the indoor unit 2 every five minutes, executes the thinning processing in a case where the operation history data for 48 hours have been stored, and transmits the operation history data for 48 hours after the thinning processing to the server device 5. As a result, the server device 5 can acquire the operation history data every 48 hours and generate or update the learning model using the acquired operation history data. Moreover, since the adapter 3 transmits the operation history data after the thinning processing to the server device 5, it is possible to reduce communication traffic related to the transmission of the operation history data.

FIG. 11 is a flowchart illustrating an example of a processing operation of the CPU 14 in the adapter 3 related to the thinning processing. In FIG. 11, the determination unit 14B in the CPU 14 determines whether or not operation history data whose amount of change between operation history data continuous in the order of the older time stamp is within a predetermined range have been selected from the operation history data for 48 hours (Step S21).

In a case where the operation history data whose amount of change is within the predetermined amount of range have been selected (Step S21 Yes), the erasing unit 14C in the CPU 14 thins operation history data other than operation history data having the oldest time stamp among the selected operation history data (Step S22).

After the operation history data are thinned in Step S22, the determination unit 14B determines whether or not there is unselected operation history data whose amount of change is within the predetermined range (Step S23). In a case where there is unselected operation history data whose amount of change is within the predetermined range (Step S23 Yes), the determination unit 14B returns the processing of Step S21 in order to select the unselected operation history data whose amount of change is within the predetermined range.

In a case where there is no unselected operation history data whose amount of change is within the predetermined range (Step S23 No), the determination unit 14B ends the processing operation illustrated in FIG. 11. In a case where the operation history data whose amount of change is within the predetermined range have not been selected (Step S21 No), the determination unit 14B ends the processing operation illustrated in FIG. 11.

As described above, the adapter 3 does not transmit all of the operation history data for 48 hours and the time stamps given to the operation history data for 48 hours to the server device 5, and thins all of a plurality of operation history data whose amount of change is within the predetermined range among continuous operation history data for 48 hours except for the oldest operation history data of the plurality of operation history data. As a result, it is possible to reduce communication traffic at the time of transmitting the operation history data and the time stamps given to the operation history data between the adapter 3 and the server device 5.

FIG. 12 is a flowchart illustrating an example of a processing operation of the CPU 33 in the server device 5 related to update processing. The update processing is processing on the server device 5 side that updates the learning model using the operation history data for 48 hours received from the adapter 3. Here, a case where the server device 5 updates the sensible temperature setting prediction model using operation history data for three weeks is exemplified. The reception unit 33B in the CPU 33 in the server device 5 determines whether or not the operation history data for 48 hours and the time stamps given to the operation history data for 48 hours have been received from the adapter 3 (Step S31). In a case where the operation history data for 48 hours and the time stamps given to the operation history data for 48 hours have been received (Step S31 Yes), the determination unit 33C in the CPU 33 determines whether or not there is a thinning section in the received operation history data for 48 hours (Step S32).

In a case where there is a thinning section in the received operation history data for 48 hours (Step S32 Yes), the restoration unit 33D in the CPU 33 restores operation history data of the thinning section and a time stamp given to the operation history data of the thinning section among the operation history data for 48 hours and the time stamps given to the operation history data for 48 hours by restoration processing illustrated in FIG. 13 to be described later (Step S33). Note that the restoration unit 33D decides that a section in which there is no time stamp is the thinning section on the basis of the presence or absence of the time stamp.

The restoration unit 33D stores the operation history data for 48 hours and the time stamps given to the operation history data for 48 hours in the data memory 32A (Step S34) after executing the restoration processing. The model learning unit 33A in the CPU 33 stores the operation history data for 48 hours and the time stamps given to the operation history data for 48 hours, and then determines whether or not the stored operation history data and the time stamps given to the operation history data are those for three weeks or more (Step S35). Note that the model learning unit 33A determines whether or not the stored operation history data are operation history data for three weeks or more according to, for example, the number of counts of the time stamps having a cycle of five minutes. In a case where the operation history data and the time stamps given to the operation history data are those for three weeks or more (Step S35 Yes), the model learning unit 33A generates or updates the learning model such as the sensible temperature setting prediction model or the like on the basis of the operation history data for three weeks or more and the time stamps given to the operation history data for three weeks or more (Step S36).

After the learning model is generated or updated, the transmission unit 33E in the CPU 33 transmits the learning model to the adapter 3 (Step S37), and ends the processing operation illustrated in FIG. 12.

In addition, in a case where the reception unit 33B does not receive the operation history data for 48 hours and the time stamps given to the operation history data for 48 hours from the adapter 3 (Step S31 No), the reception unit 33B ends the processing operation illustrated in FIG. 12. In a case where there is not thinning section in the received operation history data for 48 hours and the time stamps given to the operation history data for 48 hours (Step S32 No), the CPU 33 returns to the processing of Step S34 in order to store the operation history data for 48 hours and the time stamps given to the operation history data for 48 hours.

In addition, in a case where the stored operation history data for 48 hours and the time stamps given to the operation history data for 48 hours are not those for three weeks or more (Step S35 No), the CPU 33 returns to the processing of Step S31 in order to determine whether or not the operation history data for 48 hours and the time stamps given to the operation history data for 48 hours have been received from the adapter 3.

As described above, in a case where there is a thinning section in the operation history data for 48 hours received from the adapter 3, the server device 5 that executes the update processing restores the thinning section and stores the operation history data for 48 hours after the restoration in the data memory 32A. Further, in a case where the operation history data for 48 hours after the restoration stored in the data memory are operation history data for three weeks, the server device 5 generates or updates the sensible temperature setting prediction model and transmits the generated or updated learning model to the adapter 3. As a result, the server device 5 can maintain accuracy of the generated or updated learning model even though the thinned operation history data are acquired from the adapter 3.

Note that a case where the sensible temperature setting prediction model is generated or updated, for example, in a case where the operation history data for 48 hours are the operation history data for three weeks has been exemplified for convenience of explanation, but the learning model is not limited to the operation history data for three weeks or the sensible temperature setting prediction model, and can be appropriately changed according to a storage amount of the operation history data.

FIG. 13 is a flowchart illustrating an example of a processing operation of the CPU 33 in the server device 5 related to the restoration processing. In FIG. 13, the restoration unit 33D in the CPU 33 in the server device 5 certifies the thinning section as a section in which there is no time stamp on the basis of the presence or absence of the time stamp among the operation history data for 48 hours and the time stamps given to the operation history data for 48 hours (Step S41). After the restoration unit 33D certifies the thinning section, the restoration unit 33D selects operation history data immediately before the thinning section and a time stamp given to the operation history data immediately before the thinning section on the basis of the presence or absence of the time stamp (Step S42). Note that the restoration unit 33D refers to the presence or absence of the time stamp, and selects operation history data with a time stamp immediately before the thinning section and a time stamp given to the operation history data. The restoration unit 33D restores operation history data of the thinning section and a time stamp given to the operation history data of the thinning section on the basis of the operation history data immediately before the thinning section and the time stamp given to the operation history data immediately before the thinning section (Step S43). For example, in a case where the restoration unit 33D certifies that a section from 12:05 to 12:15 is the thinning section, operation history data at 12:00 becomes the operation history data immediately before the thinning section. Therefore, the restoration unit 33D restores the operation history data of the thinning section and the time stamp given to the operation history data of the thinning section by copying the operation history data at 12:00 as operation history data at 12:05, 12:10 and 12:15.

Further, after the operation history data of the thinning section and the time stamp given to the operation history data of the thinning section are restored, the determination unit 33C determines whether or not there is an uncertified thinning section (Step S44). In a case where there is an uncertified thinning section (Step S44 Yes), the CPU 33 returns to the processing of Step S41 in order to certify the uncertified thinning section in the order of time stamps. In a case where there is no uncertified thinning section (Step S44 No), the determination unit 33C ends the processing operation illustrated in FIG. 13.

As described above, the server device 5 that executes the restoration processing certifies the thinning section from the operation history data for 48 hours, and restores the operation history data of the thinning section and the time stamp given to the operation history data of the thinning section from the operation history data immediately before the thinning section and the time stamp given to the operation history data immediately before the thinning section. As a result, the server device 5 can generate or update a highly accurate learning model using the operation history data after the thinning.

The adapter 3 according to the present embodiment temporally acquires the operation history data from the indoor unit 2 every predetermined cycle, and determines whether or not an amount of change between temporally continuous operation history data of the acquired operation history data is within a predetermined range in a case where the acquired operation history data are operation history data for a predetermined period. The adapter 3 leaves the oldest operation history data and thins the other operation history data among the continuous operation history data in a case where the amount of change between the continuous operation history data is within the predetermined range. Further, the adapter 3 transmits data for a predetermined period after the thinning to the server device 5. As a result, the adapter 3 can reduce communication traffic from the adapter 3 to the server device 5 by thinning a data amount of operation history data.

The adapter 3 adds time stamps for each acquisition timing to the operation history data acquired every predetermined timing. As a result, the adapter 3 can manage the operation history data in time series with reference to the time stamps.

The adapter 3 leaves the oldest operation history data and the time stamp given to the oldest operation history data and thins the other operation history data and the time stamps given to the other operation history data, among the continuous operation history data between which the amount of change is within the predetermined range and the time stamps given to the continuous operation history data. As a result, the adapter 3 can leave the oldest operation history data and thin the other operation history data with reference to the time stamps among the continuous operation history data between which the amount of change is within the predetermined range.

In a case where the amount of change between the continuous operation history data is within the predetermined range, the adapter 3 decides that the continuous operation history data are data within the range that does not affect the human bodily sensation in a case where the indoor unit 2 has been controlled using the result of the learning of the AI. As a result, the continuous operation history data, which are the operation history data within the range that does not affect the human bodily sensation in a case where the indoor unit 2 has been controlled using the result of the learning of the AI, are thinned, and communication traffic of the operation history data at the time of transmitting the operation history data from the adapter 3 to the server device 5 can thus be reduced.

The adapter 3 determines whether or not the amount of change between the continuous operation history data is zero within the predetermined range. As a result, it is possible to reduce the communication traffic of the operation history data at the time of transmitting the operation history data from the adapter 3 to the server device 5.

The adapter 3 sets a predetermined range that differs for each season such as summer, winter or the like, and determines whether or not the amount of change between the continuous operation history data is within the predetermined range according to a current season. As a result, the server device 5 can generate or update the learning model according to the season by using the predetermined range of the amount of change according to the season.

The adapter 3 sets a predetermined range of the amount of change that differs for each use of an air conditioner such as a household air conditioner, a commercial air conditioner or the like, and determines whether or not the amount of change between the temporally continuous operation history data is within the predetermined range according to use of the air conditioner. As a result, the server device 5 can generate or update the learning model according to the use by using the predetermined range of the amount of change according to the use.

The server device 5 determines whether or not there is a thinning section in the operation history data for a predetermined period on the basis of the time stamp of each operation history data in a case where the operation history data for a predetermined period and the time stamps given to the operation history data for a predetermined period have been received from the adapter 3. In a case where the server device 5 has determined that there is a thinning section, the server device 5 restores the operation history data for a predetermined period and the time stamps given to the operation history data for a predetermined period by generating the operation history data of the thinning section and the time stamp given to the operation history data of the thinning section on the basis of the operation history data immediately before the thinning section and the time stamp given to the operation history data immediately before the thinning section. The server device 5 updates the learning model on the basis of the restored operation history data for a predetermined period and the time stamps given to the restored operation history data for a predetermined period. As a result, the server device 5 can generate or update a highly accurate learning model using the operation history data for a predetermined period.

Note that the sensible temperature setting prediction model has been exemplified as the learning model in the present embodiment, but the learning model is not limited thereto and can be appropriately changed. In addition, since operation history data needed for learning differ depending on the learning model, contents of the operation history data can be appropriately changed. In addition, since an acquisition cycle or a collection amount needed for learning differs depending on the learning model, the predetermined cycle and the predetermined period can be appropriately changed.

A case where all data groups including at least one data are transmitted to the server device 5 in a case where an amount of change between the at least one data among a plurality of data groups of continuous operation history data is not within a predetermined range has been exemplified in the present embodiment. However, even in a case where the amount of change between at least one data among the plurality of data groups is not within the predetermined range, data between which an amount of change is within a predetermined range among the plurality of data groups may be thinned and only data between which an amount of change is not within the predetermined range among the plurality of data groups may be transmitted to the server device 5, and an appropriate change can be made.

A case where the adapter 3 transmits the operation history data of the indoor unit 2 to the server device 5 via the relay device 6 has been exemplified, but the adapter 3 does not transmit operation history data via the relay device 6 and may transmit the operation history data to the server device 5 as it is, and can be appropriately changed.

In addition, each component of the respective unit that are illustrated does not necessarily have to be physically configured as illustrated. That is, specific forms of distribution and integration of the respective units are not limited to those illustrated, and all or some of the units can be configured to be functionally or physically distributed and integrated in any units according to various loads, use situations or the like.

Further, all or arbitrary some of various processing functions performed by each device may be executed on a central processing unit (CPU) (or a microcomputer such as a micro processing unit (MPU), a micro controller unit (MCU) or the like). In addition, it goes without saying that all or arbitrary some of the various processing functions may be executed on a program analyzed and executed by the CPU (or the microcomputer such as the MPU, the MCU or the like) or on hardware by a wired logic.

EXPLANATION OF REFERENCE

Reference Signs List

1 Air conditioning system
2 Indoor unit
2A Main body
2B Control unit
3 Adapter
5 Server device
14A Acquisition unit
14B Determination unit
14C Erasing unit
14D Transmission unit
14E Reception unit
14F Setting unit
14G Prediction control unit
33A Model learning unit
33B Reception unit
33C Determination unit
33D Restoration unit
33E Transmission unit

The invention claimed is:

1. An air conditioner comprising an adapter including processing circuitry coupled to a memory and configured to:
control the air conditioner using a learning model and communicate with a server device that generates the learning model on the basis of operation history data of the air conditioner,
wherein the processing circuitry is configured to:
acquire the data every predetermined cycle from the air conditioner, the predetermined cycle corresponding to a predetermined time period;
determine whether or not an amount of change between temporally continuous data of the data acquired by the acquiring is within a predetermined range;
leave at least one of the continuous data and delete the other data in a case where the amount of change between the continuous data is within the predetermined range; and
transmit the data after being deleted by the deleting to the server device,
wherein, to determine whether or not the amount of change is within the predetermined range, the processing circuitry is further configured to:
set a predetermined range that differs for each season and determine whether or not the amount of change between the temporally continuous data is within the predetermined range according to a current season.

2. The air conditioner according to claim 1, wherein, to determine whether or not the amount of change is within the predetermined range, the processing circuitry is further configured to:
determine whether or not the amount of change between the continuous data is within the predetermined range within a range where an influence does not occur in a case where the air conditioner is controlled using a result of learning of the learning model.

3. The air conditioner according to claim 1, wherein, to determine whether or not the amount of change is within the predetermined range, the processing circuitry is further configured to:
determine whether or not the continuous data are the same as each other instead of determining whether or not the amount of change between the continuous data is within the predetermined range, and
leave at least one of the continuous data and delete the other data in a case where the continuous data are the same as each other.

4. The air conditioner according to claim 1, wherein the data includes at least any one of a set temperature, an indoor temperature, an indoor humidity, and an outdoor temperature related to the air conditioning control, and
the processing circuitry is further configured to determine whether or not the amount of change between the continuous data is within the predetermined range.

5. An air conditioner comprising an adapter including processing circuitry coupled to a memory and configured to:
control the air conditioner using a learning model and communicate with a server device that generates the learning model on the basis of operation history data of the air conditioner,
wherein the processing circuitry is configured to:
acquire the data every predetermined cycle from the air conditioner, the predetermined cycle corresponding to a predetermined time period;
determine whether or not an amount of change between temporally continuous data of the data acquired by the acquiring is within a predetermined range;
leave at least one of the continuous data and delete the other data in a case where the amount of change between the continuous data is within the predetermined range; and
transmit the data after being deleted by the deleting to the server device,
wherein, to determine whether or not the amount of change is within the predetermined range, the processing circuitry is further configured to:
set a predetermined range that differs for each use of the air conditioner and determine whether or not the amount of change between the temporally continuous data is within the predetermined range according to use of the air conditioner.

6. The air conditioner according to claim 1, wherein, to acquire the data, the processing circuitry is further configured to:
add time stamps to the data acquired every predetermined cycle at the predetermined cycle of the data.

7. The air conditioner according to claim 6, wherein, to leave the at least one of the continuous data and delete the other data, the processing circuitry is further configured to:
leave at least one data and time stamp of the continuous data between which the amount of change is within the predetermined range and the time stamps and delete the other data and time stamps.

8. A data transmission method of an air conditioner including an adapter including processing circuitry coupled to a memory, the method comprising: controlling the air conditioner using a learning model and communicating with a server device that generates the learning model on the basis of operation history data of the air conditioner,
acquiring the data every predetermined cycle by the adapter from the air conditioner, the predetermined cycle corresponding to a predetermined time period;

determining whether or not an amount of change between temporally continuous data of the acquired data is within a predetermined range by the adapter;

leaving at least one of the continuous data and deleting the other data in a case where the amount of change between the continuous data is within the predetermined range, by the adapter; and transmitting the data after being deleted to the server device by the adapter, wherein the determining sets a predetermined range that differs for each season and determines whether or not the amount of change between the temporally continuous data is within the predetermined range according to a current season.

9. Air conditioning system comprising an air conditioner, an adapter equipped with a first processing circuitry coupled to a first memory and configured to: control the air conditioner using a learning model, and a server device that generates the learning model on the basis of operation history data of the air conditioner, wherein the first processing circuitry is configured to:

acquire the data every predetermined cycle and time stamps at the predetermined cycle from the air conditioner, the predetermined cycle corresponding to a predetermined time period;

determine whether or not an amount of change between temporally continuous data of the data acquired by the acquiring is within a predetermined range;

leave at least one data and time stamp of the continuous data and delete the other data and time stamps in a case where the amount of change between the continuous data is within the predetermined range; and transmit the data and the time stamps after being deleted by the deleting to the server device, the server device includes a second processing circuitry coupled to a second memory and configured to:

determine whether or not there is a deletion section in the data on the basis of the time stamp of each data in a case where the data and the time stamps have been received from the adapter;

restore the received data and time stamps by generating data and a time stamp of the deletion section on the basis of data and a time stamp immediately before the deletion section in a case where it has been determined that there is the deletion section;

generate the learning model on the basis of the received data and time stamps restored by the restoring; and transmit the learning model generated by the generating to the adapter, and the first processing circuitry is further configured to:

apply the learning model received from the server device.

10. A data transmission method of an air conditioner including an adapter including processing circuitry coupled to a memory, the method comprising: controlling the air conditioner using a learning model and communicating with a server device that generates the learning model on the basis of operation history data of the air conditioner, acquiring the data every predetermined cycle by the adapter from the air conditioner, the predetermined cycle corresponding to a predetermined time period;

determining whether or not an amount of change between temporally continuous data of the acquired data is within a predetermined range by the adapter;

leaving at least one of the continuous data and deleting the other data in a case where the amount of change between the continuous data is within the predetermined range, by the adapter; and transmitting the data after being deleted to the server device by the adapter, wherein the determining sets a predetermined range that differs for each use of the air conditioner and determines whether or not the amount of change between the temporally continuous data is within the predetermined range according to use of the air conditioner.

* * * * *